US008531330B2

(12) United States Patent
Song et al.

(10) Patent No.: US 8,531,330 B2
(45) Date of Patent: Sep. 10, 2013

(54) METHOD AND DEVICE FOR RECOGNIZING PRI MODULATION TYPE OF RADAR SIGNAL

(75) Inventors: Kyu-Ha Song, Daejeon (KR); Jin-Woo Han, Daejeon (KR); Byung-Koo Park, Chungcheongnam-Do (KR); Je-Il Jo, Daejeon (KR)

(73) Assignee: Agency For Defense Development (KR)

( * ) Notice: Subject to any disclaimer, the term of this patent is extended or adjusted under 35 U.S.C. 154(b) by 214 days.

(21) Appl. No.: 13/229,876

(22) Filed: Sep. 12, 2011

(65) Prior Publication Data
US 2012/0293363 A1  Nov. 22, 2012

(30) Foreign Application Priority Data

May 20, 2011 (KR) .................. 10-2011-0048123

(51) Int. Cl.
*G01S 7/28* (2006.01)
(52) U.S. Cl.
USPC ............... 342/195; 342/13; 342/91; 342/130; 342/135; 342/137
(58) Field of Classification Search
USPC ............... 342/13, 90–91, 130–135, 137, 139, 342/195
See application file for complete search history.

(56) References Cited

U.S. PATENT DOCUMENTS

| | | | | |
|---|---|---|---|---|
| 4,025,920 A | * | 5/1977 | Reitboeck et al. | 342/13 |
| 4,516,220 A | * | 5/1985 | Baumann | 708/212 |
| 5,534,867 A | * | 7/1996 | Rose | 342/17 |
| 5,614,912 A | * | 3/1997 | Mitchell | 342/146 |
| 6,313,781 B1 | * | 11/2001 | Lee | 342/13 |
| 6,411,249 B1 | * | 6/2002 | Rose | 342/13 |
| 7,397,415 B1 | * | 7/2008 | Wang et al. | 342/13 |
| 7,791,526 B2 | * | 9/2010 | Gounalis | 342/13 |
| 7,830,297 B1 | * | 11/2010 | Wang et al. | 342/13 |
| 8,102,297 B2 | * | 1/2012 | Drake et al. | 342/13 |
| 2005/0156780 A1 | * | 7/2005 | Bonthron et al. | 342/107 |
| 2010/0283666 A1 | * | 11/2010 | Lee et al. | 342/175 |
| 2012/0293363 A1 | * | 11/2012 | Song et al. | 342/195 |

OTHER PUBLICATIONS

C.S. Daw et al., "Symbolic approach for measuring temporal 'irreversibility'," Physical Review E, vol. 62, No. 2, pp. 1912-1921, Aug. 2000.
C.S. Daw et al., "A review of symbolic analysis of experimental data," Review of Scientific Instruments, vol. 74, No. 2, pp. 915-932, Feb. 2003.

(Continued)

*Primary Examiner* — John B Sotomayor
(74) *Attorney, Agent, or Firm* — Ostrolenk Faber LLP

(57) ABSTRACT

A method and device for recognizing a pulse repetition interval (PRI) modulation type of a radar signal are provided. The method for recognizing a pulse repetition interval (PRI) modulation type includes: extracting time of arrival (TOA) information of pulses aligned in time order from a received radar signal; generating a PRI sequence based on a difference of adjacent TOAs in the TOA information of pulses; generating a difference of PRIs (DPRI) sequence by using a difference of the adjacent PRIs in the PRI sequence; generating respective symbol sequences by using specific partition rules from the PRI sequence and the DPRI sequence; and calculating characteristic factors from the symbol sequences, and comparing the characteristic factors with threshold values for discriminating a PRI modulation type to determine the PRI modulation type. Thus, the PRI modulation type, a promising feature for radar signal identification, can be precisely derived.

10 Claims, 5 Drawing Sheets

(56) References Cited

OTHER PUBLICATIONS

Kyu-Ha Song et al., "Pulse Repetition Interval Modulation Recognition Using Symbolization," 2010 Digital Image Computing: Techniques and Applications, pp. 540-545, 2010.

Young-Jin Ryoo et al. "Recognition of PRI Modulation Types of Radar Signals Using the Autocorrelation," IEICE Trans. Commun., vol. E90-B, No. 5, pp. 1290-1294, May 5, 2007.

Gregory P. Noone, "A Neural Approach to Automatic Pulse Repetition Interval Modulation Recognition," Proceedings of Information Decision and Control, IDC 99, pp. 213-218, 1999.

H.K. Mardi; BSc, Ph.D. "New techniques for the deinterleaving of repetitive sequences," IEE Proceedings., vol. 136, Pt. F, No. 4, pp. 149-154, Aug. 1989.

D.J. Milojević et al., "Improved algorithm for the deinterleaving of radar pulses," IEE Proceedings-F, vol. 139, No. 1, pp. 98-104, Feb. 1992.

Douglas E. Driscoll et al., "The Detection of Radar Pulse Sequences by Means of a Continuous Wavelet Transform," 1999 IEEE International Conference on Acoustics, Speech, and Signal Processing, vol. 3, pp. 1389-1392, 1999.

C.S. Daw et al., "Symbol Statistics: A New Tool for Understanding Multiphase Flow Phenomena," 1998 International Mechanical Engineering Congress & Exposition, Anaheim, California, pp. 221-229, Nov. 15-20, 1998.

\* cited by examiner

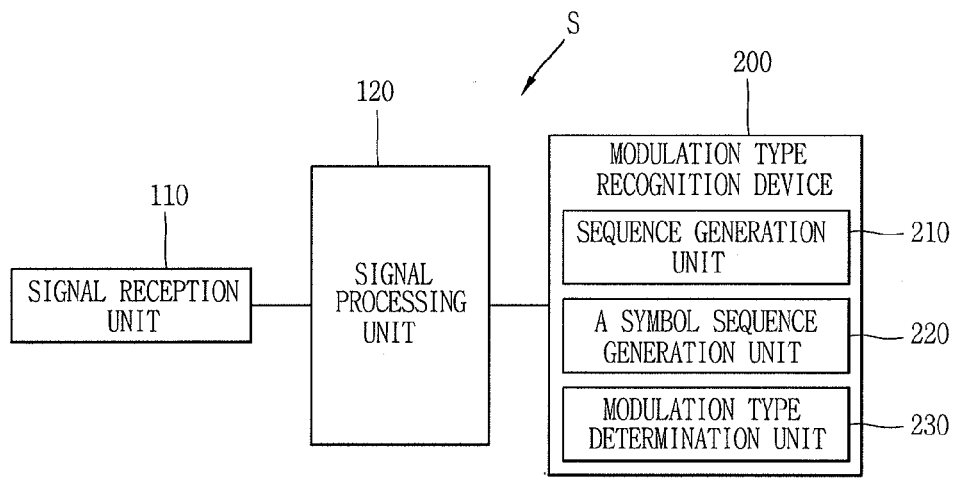
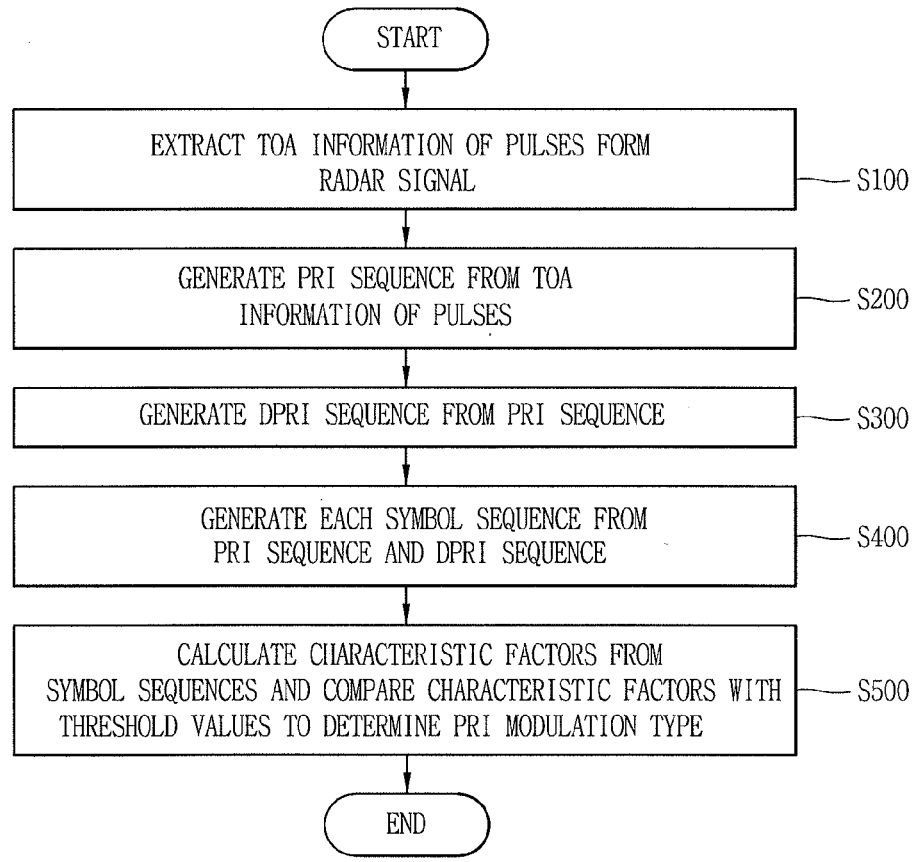

Time Index

Time Index

Time Index

METHOD AND DEVICE FOR RECOGNIZING PRI MODULATION TYPE OF RADAR SIGNAL

Pursuant to 35 U.S.C. §119(a), this application claims the benefit of earlier filing date and right of priority to Korean Application No. 10-2011-0048123, filed on May 20, 2011, the contents of which is incorporated by reference herein in its entirety.

FIELD OF THE INVENTION

The present invention relates to a method and device for recognizing a pulse repetition interval (PRI) modulation type of a radar signal.

DESCRIPTION OF THE RELATED ART

An electronic warfare support system refers to a system for detecting and identifying a radar signal in a high density electromagnetic wave signal environment. For a detection and identification, the electronic warfare support system receives radar signals omnidirectionally, measures pulse parameters in real time, and separates each radar signal source based on signal continuity, regularity, and correlation in collected pulse train data in which multiple signals mixedly exist. Also, the electronic warfare support system analyzes inter-pulse and intra-pulse modulation characteristics with respect to pulse train data of each radar signal source, and finally compares the same with an internal identification library to identify a radar signal.

Recently, as the radar technology in relation to electronic protection has been gradually advanced and electronic equipment using an electromagnetic wave signal has been rapidly increased, it is increasingly difficult to precisely identify each signal source.

In particular, a pulse repetition interval (PRI) modulation type of a radar signal is a key identification variable which can contribute to an improvement of signal detection and identification capabilities in the electronic warfare support system. Thus, a method for recognizing a PRI modulation type which is robust to noise pulses and is able to enhance an identification rate may be considered.

SUMMARY OF THE INVENTION

An aspect of the present invention provides a method for recognizing a PRI modulation type capable of enhancing an identification rate and a device employing the same.

According to an aspect of the present invention, there is provided a method for recognizing a pulse repetition interval (PRI) modulation type of a radar signal, including: extracting time of arrival (TOA) information of pulses aligned in time order from received radar signals; generating a PRI sequence based on a difference of adjacent TOAs in the TOA information of pulses; generating a difference of PRIs (DPRI) sequence by using a difference of the adjacent PRIs in the PRI sequence; generating respective symbol sequences by using a partition rule from the sequence of PRI and the sequence of DPRI; and calculating characteristic factors from the symbol sequences, and comparing the characteristic factors with threshold values for discriminating a PRI modulation type to determine the PRI modulation type.

The generating of the symbol sequences may include: extracting a PRI symbol series by applying a binary partition rule to the PRI sequence and generating a PRI symbol sequence from the PRI symbol series; and extracting a DPRI symbol series by applying a partition rule to have three symbols to the DPRI sequence and generating a DPRI symbol sequence from the DPRI symbol series.

The determining of the PRI modulation type may include: calculating first characteristic factor from a symbol sequence histogram with respect to the PRI symbol sequence and comparing the first characteristic factor with a threshold value for discriminating a jittered PRI modulation type of complex PRI modulation types such as jittered, wobulated, sliding-down, sliding-up, and D&S (Dwell & Switch) PRI modulation.

The determining of the PRI modulation type may include: converting the DPRI symbol sequence into an equivalent decimal number to generate a code series, and calculating second and third characteristic factors; and comparing the second characteristic factor and a threshold value for discriminating a wobulated PRI modulation type.

The determining of the PRI modulation type may further include: comparing the third characteristic factor with threshold values for discriminating sliding-down, sliding-up, and D&S (Dwell & Switch) PRI modulation types.

In determining the PRI modulation type, when the first characteristic factor is greater than the threshold value for discriminating the jittered PRI modulation type, the PRI modulation type may be determined to be the jittered PRI modulation type, and when the first characteristic factor is smaller than the threshold value for discriminating the jittered PRI modulation type, the PRI modulation type may be determined to be one of wobulated, sliding-down, sliding-up, and D&S (Dwell & Switch) PRI modulation type.

The DPRI symbol series may be extracted by using the limit value of a constant or stable PRI, the minimum and maximum values of the DPRI sequence.

According to another aspect of the present invention, there is provided a method for recognizing a pulse repetition interval (PRI) modulation type of a radar signal, including: detecting time of arrival (TOA) information of pulses aligned in time order from a received radar signal; generating a PRI sequence based on a difference of TOAs in the TOA information of pulses; generating a PRI symbol sequence by using a binary partition rule from the PRI sequence; and arithmetically operating a first characteristic factor from the PRI symbol sequence, and comparing the first characteristic factor with a threshold value for a jittered PRI modulation type to determine the PRI modulation type.

The method may further include: when the PRI modulation type does not correspond to the jittered PRI modulation type, generating a difference of PRIs (DPRI) sequence by using the difference of the adjacent PRIs in the PRI sequence, and determining a PRI modulation type of the received radar signal by using the DPRI sequence.

According to another aspect of the present invention, there is provided a device for recognizing a pulse repetition interval (PRI) modulation type of a radar signal, including: a sequence generation unit extracting time of arrival (TOA) information of pulses aligned in time order from received radar signals, generating a PRI sequence based on a difference of adjacent TOAs in the TOA information of pulses, and generating a difference of PRIs (DPRI) sequence by using a difference of the adjacent PRIs in the PRI sequence; a symbol sequence generation unit generating respective symbol sequences by using a partition rule from the PRI sequence and the DPRI sequence; and a modulation type determination unit calculating characteristic factors from the symbol sequences, and comparing the characteristic factors with threshold values for discriminating a PRI modulation type to determine the PRI modulation type.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a conceptual view showing a device for recognizing a pulse repetition interval (PRI) modulation type using symbolization according to an embodiment of the present invention;

FIG. 2 is a flow chart illustrating a process of a method for recognizing a PRI modulation type according to an embodiment of the present invention;

DETAILED DESCRIPTION OF THE INVENTION

Figure 3:
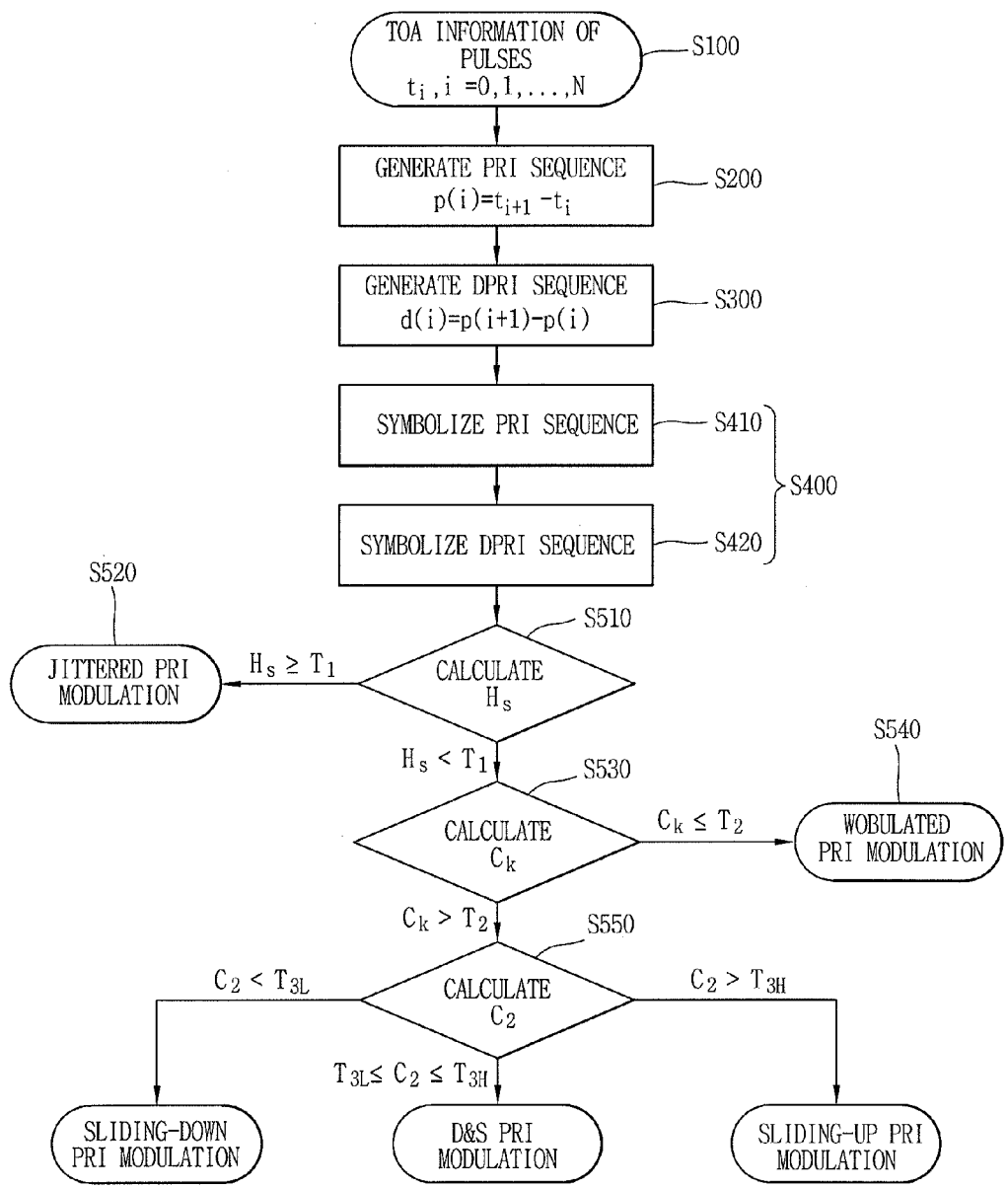
FIG. 3 is a detailed flow chart of the recognition method according to an embodiment of the present invention.
Figure 4:
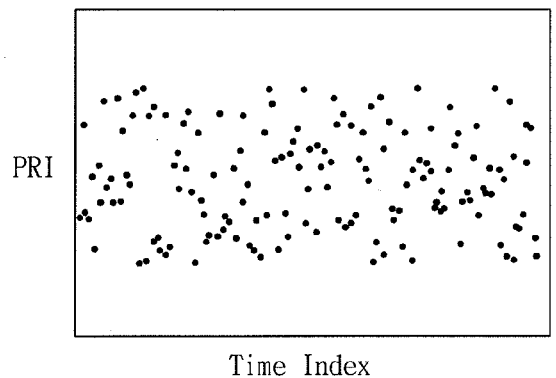
FIG. 4 is a graph showing a PRI sequence having a jittered PRI modulation type.
Figure 5:
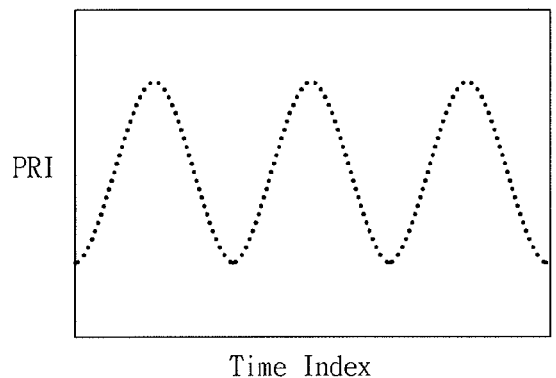
FIG. 5 is a graph showing a PRI sequence having a wobulated PRI modulation type.
Figure 6:
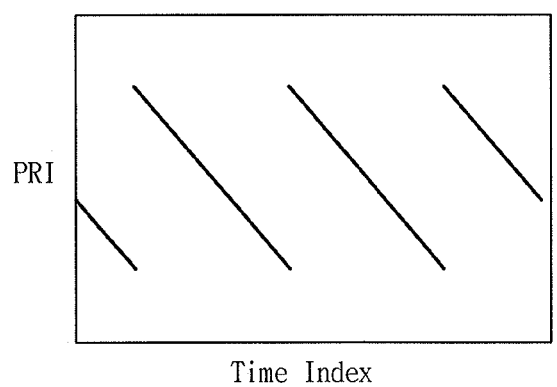
FIG. 6 is a graph showing a PRI sequence I having a sliding-down PRI modulation type.
Figure 7:
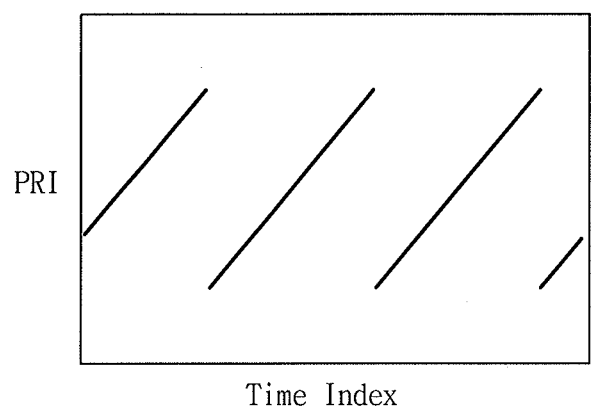
FIG. 7 is a graph showing a PRI sequence having a sliding-up PRI modulation type.
Figure 8:
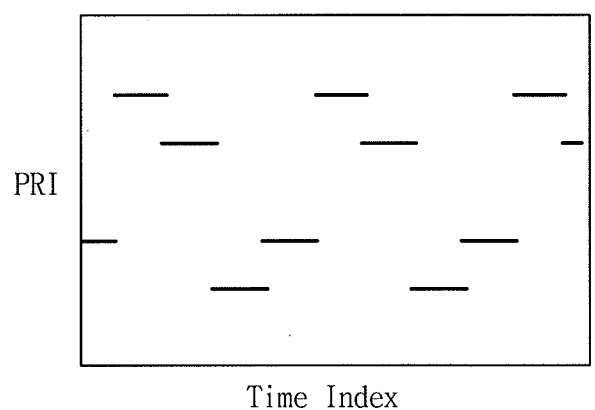
FIG. 8 is a graph showing a PRI sequence having a 4-step D&S PRI modulation type as one of various D&S PRI modulation types.

A method and device for recognizing a pulse repetition interval (PRI) modulation type of a radar signal according to embodiments of the present invention will be described. The embodiments of the present invention will now be described with reference to the accompanying drawings, in which like numbers refer to like elements throughout although the embodiments are different, and a description of the like elements of a first embodiment will be used for those of the different embodiment. As used herein, the singular forms "a", "an" and "the" are intended to include the plural forms as well, unless the context clearly indicates otherwise.

FIG. 1 is a conceptual view showing a device for recognizing a pulse repetition interval (PRI) modulation type using symbolization according to an embodiment of the present invention.

As illustrated, an electronic warfare support system (ES) includes a signal reception unit 110, a signal processing unit 120, and a pulse repetition interval (PRI) modulation type recognition device 200.

The signal reception unit 110 is formed to receive at least a radar signal, and the signal processing unit 120 processes the received radar signals including the at least a radar signal. The received signals may be processed in various manners. For example, the signal processing unit 120 may separate each radar signal source from received and measured data to extract a pulse train with respect to each signal source. Also, the signal processing unit 120 may identify each signal source by comparing analyzed results and installed identification information.

With reference to FIG. 1, the PRI modulation type recognition device 200 is formed to recognize a PRI modulation type from the received radar signal. In detail, the PRI modulation type recognition device 200 includes a sequence generation unit 210, a symbol sequence generation unit 220, and a modulation type determination unit 230.

The sequence generation unit 210 extracts time of arrival (TOA) information of pulses aligned in time order from the radar signal, and induces a PRI sequence from the TOA information of pulses. Also, the sequence generation unit 210 generates a difference of PRIs (DPRI) sequence by using differences of the adjacent PRIs in the PRI sequence.

The symbol sequence generation unit 220 converts a PRI modulation in time domain into a new symbol area by applying a symbolization scheme to the PRI sequence and the DPRI sequence. For example, the symbol sequence generation unit 220 generates each symbol sequence by using specific partition rules.

The modulation type determination unit 230 arithmetically computes characteristic factors for discriminating each of complex PRI modulation types based on statistical characteristics from the symbol sequences, and compares the characteristics factors and threshold values for discriminating the PRI modulation type to determine the PRI modulation type.

When the PRI modulation type is identified by the PRI modulation type recognition device 200, the signal processing unit 120 processes a signal according to the PRI modulation type, and through this configuration, the signal detection and identification capabilities of the electronic warfare support system can be improved.

Hereinafter, a recognition method applicable to the PRI modulation type recognition device 200 will now be described in detail. FIG. 2 is a flow chart illustrating a process of a method for recognizing a PRI modulation type according to an embodiment of the present invention. FIG. 3 is a detailed flow chart of the recognition method according to an embodiment of the present invention. FIGS. 4 to 8 are graphs showing PRI sequences having a jittered PRI modulation type, a wobulated PRI modulation type, a sliding-down PRI modulation type, a sliding-up PRI modulation type, and a 4-step D&S (Dwell & Switch) PRI modulation type, respectively.

With reference to FIGS. 2 and 3, according to the method for recognizing a PRI modulation type of a radar signal, first, information regarding time of arrival (TOA) of pulses aligned in time order from a received radar signal is extracted (S100).

For example, TOA information of (N+1) pulses may be generated to recognize a PRI modulation type from the received/measured radar signal. In detail, in a TOA information extracting step (S100), TOA information of (N+1) pulses aligned in time order, i.e., $(t_0, t_1, t_2, \ldots, t_N)$, is extracted from pulse train data of a particular radar signal obtained through a pulse train separating process. Here, $t_i$ is ith TOA of pulse of the radar signal.

Next, a PRI sequence is generated from the difference in TOA information of pulses of a radar signal (S200). For example, the PRI sequence may be derived by the difference between adjacent TOAs in the TOA information of pulses.

In detail, in the PRI sequence generating step (S200), the PRI sequence is generated by a first order difference between the sequentially adjacent TOAs in the TOA information of (N+1) pulses, i.e., $(t_0, t_1, t_2, \ldots, t_N)$.

$$p(i)=t_{i+1}-t_i, i=0,1,\ldots,N-1$$

Also, in the recognition method, a DPRI sequence is generated by using the difference of the adjacent PRIs in the PRI sequence (S300).

For example, in the DPRI sequence generating step (S300), a first order difference is applied to the sequentially adjacent PRIs in the PRI sequence obtained in the PRI sequence generating step (S200). Namely, a DPRI sequence is generated to effectively extract unique characteristics of each PRI modulation type included in the PRI sequence according to the first order difference as follows:

$$d(i)=|p(i+1)-p(i)|, i=0,1,\ldots,N-2|$$

With reference to FIGS. 2 and 3, respective symbol sequences are generated from the PRI sequence and the DPRI sequence according to specific partition rules (S400).

The step (S400) of generating the symbol sequences includes a step (S410) of generating a PRI symbol sequence and a step (S420) of generating a DPRI symbol sequence.

In the step (S410) of generating a PRI symbol sequence, a PRI symbol series is extracted by applying a binary partition rule to the PRI sequence, and a PRI symbol sequence is generated from the PRI symbol series.

The step (S410) of generating a PRI symbol sequence may be a step of symbolizing the PRI sequence. For example, characteristic factor for effectively discriminating a jittered PRI modulation type (See FIG. 4) among five complex PRI modulation types is calculated from the PRI symbol sequence generated in the step (S410).

In detail, a symbol series is extracted by applying a binary partition rule to the PRI sequence obtained in the PRI sequence generating step (S200), and a symbol sequence is formed by defining a template with a sequence length, i.e., L to group consecutive symbols, and this template is shifted along the symbol series. Namely, a symbol series $s_p(i)$ is extracted by applying a binary partition rule using an average value ($\mu_p$) of the PRI sequence, and a symbol sequence, $Q_p(i)$ is generated by using the extracted symbol series $s_p(i)$ and a template with a sequence length L.

$$s_p(i) = \begin{cases} 0 & \text{if } p(i) < \mu_p \\ 1 & \text{if } p(i) \geq \mu_p \end{cases}$$

$$Q_p(i) = s_p(i)s_p(i+1) \ldots s_p(i+L-1), i = 0, 1, \ldots, N-L$$

In the step (S420) of generating a DPRI symbol sequence, a DPRI symbol series is extracted by applying a partition rule to the DPRI sequence in order to obtain three symbols (or types of symbols), and a DPRI symbol sequence is generated from the DPRI symbol series.

In detail, in step (S420) of generating a DPRI symbol sequence, in order to induce two characteristic factors (or types of characteristic factors) from a code series of a DPRI sequence, a DPRI symbol series is extracted by applying a partition rule to the DPRI sequence in order to obtain three symbols. Next, in the step (S420), a DPRI symbol sequence is formed by defining a template with a sequence length, i.e., L to group consecutive symbols and this template is shifted along the DPRI symbol series, and a code series expressing the generated symbols sequence as an equivalent decimal number is generated.

The DPRI symbol series may be extracted by using the limit value of a constant or stable PRI, the minimum and maximum values of the DPRI sequence.

For example, a DPRI symbol series, $s_d(i)$ is extracted through a partition rule using a minimum value ($d_{min}$) and a maximum value ($d_{max}$) of the DPRI sequence, and the limit value $\epsilon$ of a constant or stable PRI. A DPRI symbol sequence $Q_d(i)$ is generated by using the extracted symbol series $s_d(i)$ and a template with a sequence length L, and a code series $c_d(i)$ is generated by to expressing the symbol sequence $Q_d(i)$ as a decimal number. Here, the number of symbols, n is 3 (i.e., n=3).

$$s_d(i) = \begin{cases} 0 & \text{if } d_{min} \leq d(i) < -\epsilon \\ 1 & \text{if } -\epsilon \leq d(i) < +\epsilon \\ 2 & \text{if } +\epsilon \leq d(i) < d_{max} \end{cases}$$

$$Q_d(i) = s_d(i)s_d(i+1) \ldots s_d(i+L-1), i = 0, 1, \ldots, N-L-1$$

$$c_d(i) = \sum_{k=0}^{L-1} n^{L-k} s_d(k+i), i = 0, 1, \ldots, N-L-1$$

With reference to FIGS. 2 and 3, in the method for recognizing a PRI modulation type of a radar signal, finally, characteristic factors are calculated from the symbol sequences, and the characteristic factors are compared with threshold values for discriminating a PRI modulation type to determine a PRI modulation type (S500).

In detail, with reference to FIG. 3, a step (S500) of determining a PRI modulation type includes a first step (S510), a second step (S520), a third step (S530), a fourth step (S540), and a fifth step (S550).

In the first step (S510), a first characteristic factor is arithmetically computed from a symbol sequence histogram with respect to the PRI symbol sequence. In the second step (S520), the first characteristic factor is compared with a threshold value for discriminating the jittered PRI modulation type. When the first characteristic factor is greater than the threshold value for discriminating the jittered PRI modulation type, the PRI modulation type is determined to be the jittered PRI modulation type.

For example, the first characteristic factor may be a characteristic factor for discriminating the jittered PRI modulation type from the five complex PRI to modulation types. In the second step (S520), the result is compared with the threshold value $T_1$, and when the result is greater than $T_1$, the PRI modulation type is recognized as the jittered PRI modulation type, or otherwise, the PRI modulation type is recognized as one of wobulated, sliding-down, sliding-up and D&S (Dwell & Switch) PRI modulation types, rather than the jittered PRI modulation type.

The first characteristic factor Hs, which is a modified Shannon entropy, is calculated from the symbol sequence histogram with respect to the symbol sequence $Q_p(i)$, obtained from the PRI sequence in the following manner, wherein $q_i$ is the probability of occurrence of ith symbol sequence, $N_{obs}$ is the number of sequences available in the symbol sequence.

$$H_s = -\frac{1}{\log(N_{obs})} \sum_i q_i \log(q_i)$$

In detail, in the third step (S530), second and third characteristic factors can be calculated by using a code series generated by converting the DPRI symbol sequence into an equivalent decimal number, and in the fourth step (S540), the second characteristic factor is compared with a threshold value for discriminating the wobulated modulation type. However, the present invention is not limited thereto, and in the third step (S530), only the second characteristic factor may be preferentially calculated.

The second characteristic factor Ck is calculated in order to discriminate the wobulated PRI modulation type from the four complex PRI modulation types when the PRI modulation type is determined to be another complex PRI modulation type, rather than the jittered PRI modulation type, in the second step (S520). In the fourth step (S540), the second characteristic factor Ck is compared with the threshold value $T_2$. When the second characteristic factor Ck is smaller than $T_2$, the PRI modulation type is determined to be the wobulated PRI modulation type, or otherwise, the fifth step (S550) is performed. The second characteristic factor Ck is calculated as follows with respect to the code series $c_d(i)$ obtained from the DPRI sequence, and $\mu_c$ is a sample average value of $c_d(i)$.

$$C_k = \frac{\frac{1}{N-L}\sum_{i=0}^{N-L-1}(c_d(i)-\mu_c)^4}{\left(\frac{1}{N-L}\sum_{i=0}^{N-L-1}(c_d(i)-\mu_c)^2\right)^2} - 3$$

In the fifth step (S550), the third characteristic factor is compared with the threshold values for discriminating the sliding-down, sliding-up, and D&S PRI modulation types respectively.

The third characteristic factor $C_2$ is calculated as follows with respect to the code series $c_d(i)$ obtained from the DPRI sequence.

$$C_2 = \frac{1}{N-L}\sum_{i=0}^{N-L-1}\left(\frac{c_d(i)}{\alpha}\right)^2$$

$$\alpha = (n-1)\sum_{i=0}^{L-1} n^i$$

Namely, in the fifth step (S550), when the PRI modulation type is not recognized as the wobulated PRI modulation type in fourth step (S540), the third characteristic factor $C_2$ is calculated, and the result is compared with the threshold values $T_{3L}$ and $T_{3H}$ to recognize the respective PRI modulation types. Accordingly, the PRI modulation type is discriminated as the sliding-down, sliding-up, and D&S PRI modulation types. Namely, when $C_2$ is smaller than $T_{3L}$, the modulation type is recognized as the sliding-down PRI modulation type. When $C_2$ is greater than $T_{3H}$, the modulation type is recognized as the sliding-up PRI modulation type. When $C_2$ is greater than $T_{3L}$ but smaller than $T_{3H}$, the modulation type is recognized as the D&S PRI modulation type.

As described above, in an embodiment of the present invention, the PRI sequence and the DPRI sequence are derived from the TOA information of the pulses of a received radar signal, and the five complex PRI modulation types can be accurately recognized by the three characteristic factors extracted from the symbol information obtained by applying the symbolization scheme to each of the sequences.

Figure 9:
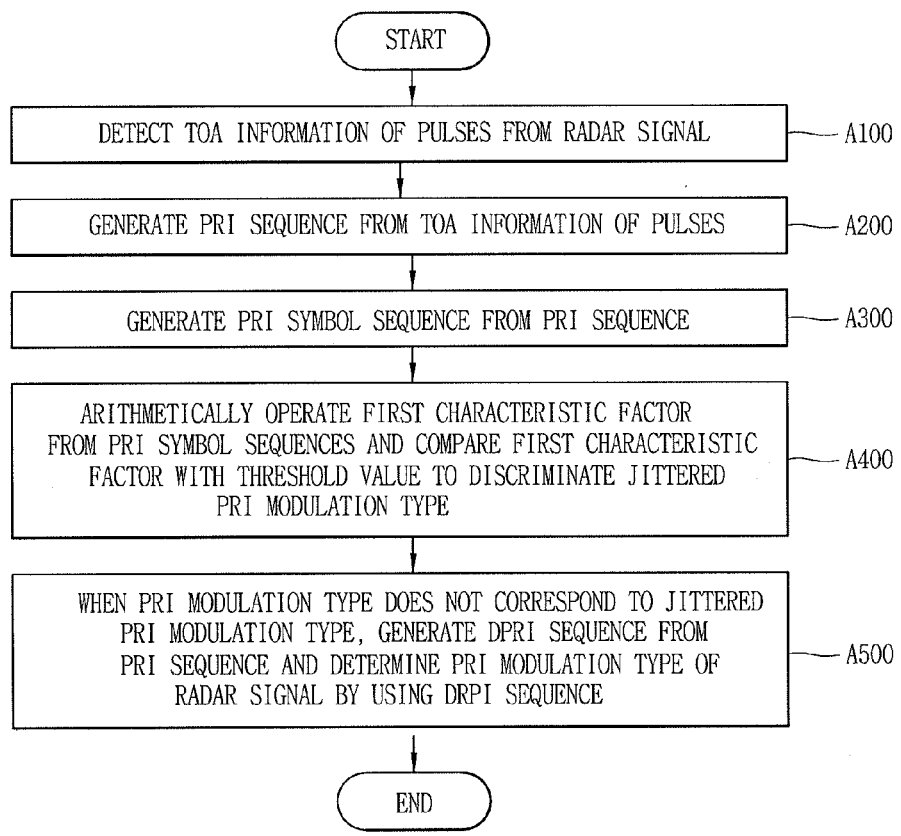
FIG. 9 is a flow chart illustrating a process of a method for recognizing a PRI modulation type according to another embodiment of the present invention.

Hereinafter, a method for recognizing a pulse repetition interval (PRI) modulation type of a radar signal according to another embodiment of the present invention will be described. FIG. 9 is a flow chart illustrating a process of a method for recognizing a PRI modulation type according to another embodiment of the present invention.

With reference to FIG. 9, in the method for recognizing a PRI modulation type of a radar signal according to another embodiment of the present invention, TOA information of pulses aligned in time order from a received radar signal is detected (A100), and a PRI sequence is generated from the difference in TOA information of pulses of a received radar signal (A200). Thereafter, a PRI symbol sequence is generated by using a binary partition rule from the PRI sequence (A300), a first characteristic factor is calculated from the PRI symbol sequence, and the first characteristic factor is compared with a threshold value for discriminating the jittered PRI modulation type from five complex PRI modulation types to determine the PRI modulation type (A400).

Namely, in the this recognition method, when the first characteristic factor is greater than the threshold value for discriminating the jittered PRI modulation type, the PRI modulation type is determined to be the jittered PRI modulation type.

Next, when the PRI modulation type does not correspond to the jittered PRI modulation type, a DPRI sequence is generated by using the difference of the adjacent PRIs in the PRI sequence, and a PRI modulation type of the received radar signal is determined by using the DPRI sequence (A500).

The step (S500) of determining a PRI modulation type may include the step (S420) of generating a DPRI symbol sequence provided in the recognition method described above with reference to FIG. 3, the third step (S530), the fourth step (S540), and the fifth step (S550) (See FIG. 3).

In the present embodiment, when the modulation type of the radar signal corresponds to the jittered PRI modulation type, there is no need to determine whether or not the PRI modulation type corresponds to any one of the wobulated, sliding-down, sliding-up, and D&S (Dwell & Switch) PRI modulation types. Thus, the amount of calculation for determining the modulation type can be reduced.

In the method and device for recognizing a PRI modulation type of a radar signal according to embodiments of the present invention, the characteristic factors capable of accurately recognizing a PRI modulation type by applying the symbolization scheme to the PRI sequence and the DPRI sequence are proposed. Accordingly, the PRI modulation type, key information capable of significantly enhancing the radar signal identification capability of the electronic warfare support system, can be accurately derived.

Also, since five complex PRI modulation types are recognized by using the three characteristic factors extracted from the symbol information obtained by applying the symbolization scheme, the method and device for recognizing a PRI modulation type of a radar signal capable of reducing the amount of calculation can be implemented.

The method and device for recognizing a PRI modulation type of a radar signal according to the embodiments of the present disclosure are not limited to the foregoing configurations and methods, but the entirety or a portion of the embodiments can be selectively combined to be configured into various modifications.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for recognizing a pulse repetition interval (PRI) modulation type, the method comprising:
   extracting time of arrival (TOA) information of pulses aligned in time order from a received radar signal;
   generating a PRI sequence based on a difference of adjacent TOAs in the TOA information of pulses;

generating a difference of PRIs (DPRI) sequence by using a difference of the adjacent PRIs in the PRI sequence;

generating respective symbol sequences by using specific partition rules from the PRI sequence and the DPRI sequence; and calculating characteristic factors from the symbol sequences, and comparing the characteristic factors with threshold values for discriminating a PRI modulation type to determine the PRI modulation type.

2. The method of claim 1, wherein the generating of the symbol sequences comprises:

extracting a PRI symbol series by applying a binary partition rule to the PRI sequence and generating a PRI symbol sequence from the PRI symbol series; and extracting a DPRI symbol series by applying a partition rule to have three symbols to the DPRI sequence and generating a DPRI symbol sequence from the DPRI symbol series.

3. The method of claim 2, wherein the determining of the PRI modulation type comprises:

calculating first characteristic factor from a symbol sequence histogram with respect to the PRI symbol sequence and comparing the first characteristic factor with a threshold value for discriminating the jittered PRI modulation type.

4. The method of claim 3, wherein the determining of the PRI modulation type comprises:

converting the DPRI symbol sequence into an equivalent decimal number to generate a code series, and calculating second and third characteristic factors; and comparing the second characteristic factor and a threshold value for discriminating the wobulated PRI modulation type.

5. The method of claim 4, wherein the determining of the PRI modulation type further comprises:

comparing the third characteristic factor with threshold values for discriminating the sliding-down, sliding-up, and D&S PRI modulation types respectively.

6. The method of claim 3, wherein, in determining the PRI modulation type, when the first characteristic factor is greater than the threshold value for discriminating the jittered PRI modulation type, the PRI modulation type is determined to be the jittered PRI modulation type, and when the first characteristic factor is smaller than the threshold value for discriminating the jittered PRI modulation type, the PRI modulation type is determined to be one of wobulated, sliding-down, sliding-up, and D&S (Dwell & Switch) PRI modulation types.

7. The method of claim 2, wherein the DPRI symbol series are extracted by using the limit value of a constant PRI, the minimum and maximum values of the DPRI sequence.

8. A method for recognizing a pulse repetition interval (PRI) modulation type, the method comprising:

detecting time of arrival (TOA) information of pulses aligned in time order from a received radar signal;

generating a PRI sequence based on a difference of TOAs in the TOA information of pulses;

generating a PRI symbol sequence by using a binary partition rule from the PRI sequence; and arithmetically operating a first characteristic factor from the PRI symbol sequence, and comparing the first characteristic factor with a threshold value for a jittered PRI modulation type to determine the PRI modulation type.

9. The method of claim 8, further comprising:

when the PRI modulation type does not correspond to the jittered PRI modulation type, generating a difference of PRIs (DPRI) sequence by using the difference of the adjacent PRIs in the PRI sequence, and determining a PRI modulation type of the received radar signal by using the DPRI sequence.

10. A device for recognizing a pulse repetition interval (PRI) modulation type of a radar signal, the device comprising:

a sequence generation unit extracting time of arrival (TOA) information of pulses aligned in time order from a received radar signal, generating a PRI sequence based on a difference of adjacent TOAs in the TOA information of pulses, and generating a difference of PRIs (DPRI) sequence by using the difference of the adjacent PRIs in the PRI sequence;

a symbol sequence generation unit generating respective symbol sequences by using specific partition rules from the PRI sequence and the DPRI sequence; and a modulation type determination unit calculating characteristic factors from the symbol sequences, and comparing the characteristic factors with threshold values for discriminating a PRI modulation type to determine the PRI modulation type.

* * * * *